(12) United States Patent
Mullins

(10) Patent No.: US 11,762,399 B1
(45) Date of Patent: Sep. 19, 2023

(54) METHODS, SYSTEMS, APPARATUSES, AND DEVICES FOR FACILITATING TRANSFERRING FLUIDS BETWEEN CONTAINERS

(71) Applicant: Kristopher Mullins, Las Vegas, NV (US)

(72) Inventor: Kristopher Mullins, Las Vegas, NV (US)

( * ) Notice: Subject to any disclaimer, the term of this patent is extended or adjusted under 35 U.S.C. 154(b) by 0 days.

(21) Appl. No.: 17/857,069

(22) Filed: Jul. 4, 2022

(51) Int. Cl.
| | |
|---|---|
| *F17C 5/00* | (2006.01) |
| *G05D 7/06* | (2006.01) |
| *F17C 13/02* | (2006.01) |
| *F17C 13/00* | (2006.01) |
| *F17C 5/02* | (2006.01) |

(52) U.S. Cl.
CPC ........... *G05D 7/0623* (2013.01); *F17C 5/002* (2013.01); *F17C 5/02* (2013.01); *F17C 13/006* (2013.01); *F17C 13/02* (2013.01); *F17C 2201/0104* (2013.01); *F17C 2221/013* (2013.01); *F17C 2223/035* (2013.01); *F17C 2250/0443* (2013.01); *F17C 2250/0626* (2013.01); *F17C 2265/06* (2013.01)

(58) Field of Classification Search
CPC .. F17C 5/02; F17C 5/002; F17C 13/02; F17C 13/006
See application file for complete search history.

(56) References Cited

U.S. PATENT DOCUMENTS

| | | | | |
|---|---|---|---|---|
| 6,237,347 | B1* | 5/2001 | Rigby | F17C 5/02 222/61 |
| 2002/0038676 | A1* | 4/2002 | Siegele | A61M 25/0009 141/63 |
| 2019/0101245 | A1* | 4/2019 | Romanos | F17C 13/026 |
| 2020/0095113 | A1* | 3/2020 | Crispel | F17C 5/06 |
| 2020/0156924 | A1* | 5/2020 | Thieu | F17C 5/02 |

* cited by examiner

*Primary Examiner* — Brian M King
(74) *Attorney, Agent, or Firm* — Dhiraj Jindal; PATENT YOGI LLC

(57) ABSTRACT

Disclosed herein is an apparatus for facilitating transferring fluids between containers, in accordance with some embodiments. Accordingly, the apparatus comprises a first container and a regulator. Further, the first container contains a first fluid at a first pressure and transfers the first fluid to a second container. Further, the second container transfers the second fluid to a third container based on the transferring. Further, the second pressure is greater than a third pressure of a third fluid contained in the third container. Further, the regulator is operably coupled with the first container. Further, the regulator controls a mass flow rate of the first fluid transferred from the first container. Further, the transferring of the first fluid to the second container is based on the controlling. Further, the controlling facilitates maintaining a differential pressure between the second pressure and the third pressure within a differential pressure range.

14 Claims, 10 Drawing Sheets

METHODS, SYSTEMS, APPARATUSES, AND DEVICES FOR FACILITATING TRANSFERRING FLUIDS BETWEEN CONTAINERS

FIELD OF THE INVENTION

Generally, the present disclosure relates to the field of fluid handling. More specifically, the present disclosure relates to methods, systems, apparatuses, and devices for facilitating transferring fluids between containers.

BACKGROUND OF THE INVENTION

Large bulk CO2 tanks are used in multiple industries for multiple applications. Specific clients who use the large bulk CO2 tank want this large bulk CO2 tank which outputs pressure at 600-800 psi (normal bulk tanks output at 300-500 psi) to be positioned close to their internal operation, which would be on higher floors off ground level or inside a venue/building and a truck cannot refill since the truck refill hose is limited to street access and 20-25 feet distance off-street. The only other option is this bulk tank at ground level and hard piping to carry liquid CO2 throughout the building to the tank. This would cost far too much, most of the time not be logistically feasible, and would waste much CO2 in the process.

The drawback of filling or refilling the large bulk CO2 tank is logistics and limitations for truck filling only. Historical solutions for the drawback of filling or refilling the large bulk CO2 tank are installing hard pipe gas lines to transfer liquid CO2, or using high pressure CO2 cylinders, which both come at high risk, must cost, and also other drawbacks such as:

Hard pipes: inability to install hard liquid lines at all if the building already exists, limited to using a vacuum jacketed pipe to keep liquid CO2 cool to prevent it from turning to gas, and much CO2 wasted during this process with pipes.

CO2 Cylinder with siphon tube: this CO2 sits at room temperature hence why it is available at 600-800 psi normally, so there isn't as much effect of the liquid CO2 upon exit to vaporize in low humidity environments since the CO2 is at room temp anyway compared to the bulk tank which is vacuum sealed and keep the liquid CO2 much cooler, downwards of 0 degrees F. while also maintaining the high pressure achieved by the cylinders. Also moving many cylinders that weigh 150 lbs-200 lbs each individually created logistics issues.

Yet another approach is additional equipment to condense gaseous CO2 back into liquid, however, this approach requires the equipment to do so which may cost over $100,000 alone and may not be able to handle the demand required. Another major drawback is the waiting period for the CO2 truck to come to fill the bulk tank.

Therefore, there is a need for improved methods, systems, apparatuses, and devices for facilitating transferring CO2 fluids into a larger container that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating transferring fluids between containers, in accordance with some embodiments. Accordingly, the apparatus may include at least one first container and at least one regulator. Further, the at least one first container may be configured for containing at least one first fluid at a first pressure. Further, the at least one first fluid may include a carbon dioxide (CO2) gas, a carbon dioxide (CO2) liquid, or a combination of both. Further, the at least one first container may be configured for transferring the at least one first fluid to at least one second container using at least one fluid transferring mechanism based on the containing. Further, the at least one fluid transferring mechanism fluidly couples the at least one first container with the at least one second container. Further, the first pressure of the at least one first fluid may be greater than a second pressure of at least one second fluid contained in the at least one second container. Further, the at least one second fluid may include the carbon dioxide (CO2) gas, the carbon dioxide (CO2) liquid, or the combination of both. Further, the at least one second container transfers the at least one second fluid to a third container based on the transferring. Further, the second pressure of the at least one second fluid may be greater than a third pressure of a third fluid contained in the third container. Further, the third fluid may include the carbon dioxide (CO2) gas, the carbon dioxide (CO2) liquid, or the combination of both. Further, the at least one regulator may be operably coupled with the at least one first container. Further, the at least one regulator may be configured for controlling a mass flow rate of the at least one first fluid transferred from the at least one first container. Further, the transferring of the at least one first fluid to the at least one second container may be based on the controlling. Further, the controlling facilitates maintaining a differential pressure between the second pressure of the at least one second fluid and the third pressure of the third fluid within a differential pressure range.

Further disclosed herein is an apparatus for facilitating transferring fluids between containers, in accordance with some embodiments. Accordingly, the apparatus may include at least one first container and at least one regulator. Further, the at least one first container may be configured for containing at least one first fluid at a first pressure. Further, the at least one first fluid may include a carbon dioxide (CO2) gas, a carbon dioxide (CO2) liquid, or a combination of both. Further, the at least one first container may be configured for transferring the at least one first fluid to at least one second container using at least one fluid transferring mechanism based on the containing. Further, the at least one fluid transferring mechanism fluidly couples the at least one first container with the at least one second container. Further, the first pressure of the at least one first fluid may be greater than a second pressure of at least one second fluid contained in the at least one second container. Further, the at least one second fluid may include the carbon dioxide (CO2) gas, the carbon dioxide (CO2) liquid, or the combination of both. Further, the at least one second container transfers the at least one second fluid to a third container based on the transferring. Further, the second pressure of the at least one second fluid may be greater than a third pressure of a third fluid contained in the third container. Further, the third fluid may include the carbon dioxide (CO2) gas, the carbon dioxide (CO2) liquid, or the combination of both. Further, the at least one regulator may be operably coupled with the at least one first container. Further, the at least one regulator may be configured for controlling a mass flow rate of the at least one first fluid transferred from the at least one first container. Further, the transferring of the at least one first fluid to the at least one second container may be based on the controlling. Further, the controlling facilitates maintaining a differential pressure between the second pressure of the at least one second fluid and the third pressure of the third fluid within a differential pressure range. Further, the at least one regulator may include at least one sensor, a processing device, and at least one actuator. Further, the at least one sensor may be configured for generating at least one first sensor data based on detecting at least one fluid characteristic of the at least one first fluid. Further, the at least one sensor may be configured for generating at least one second sensor data based on detecting the at least one fluid characteristic of the at least one second fluid. Further, the processing device may be communicatively coupled with the at least one sensor. Further, the processing device may be configured for analyzing the at least one first sensor data and the at least one second sensor data. Further, the processing device may be configured for determining a required amount of the mass flow rate of the at least one first fluid for the maintaining of the differential pressure between the second pressure and the third pressure based on the analyzing. Further, the processing device may be configured for generating a command for the transferring of the at least one first fluid to the at least one second container based on the determining. Further, the at least one actuator may be operatably coupled with the at least one first container. Further, the at least one actuator may be communicatively coupled with the processing device. Further, the at least one actuator may be configured for transitioning to a plurality of states for allowing the transferring of the at least one first fluid with the required amount of the mass flow rate based on the command. Further, the controlling may include the allowing of the transferring of the at least one first fluid with the required amount of the mass flow rate.

Further disclosed herein is an apparatus for facilitating transferring fluids between containers, in accordance with some embodiments. Accordingly, the apparatus may include at least one first container and at least one regulator. Further, the at least one first container may include at least one high pressure tank. Further, the at least one first container may be configured for containing at least one first fluid at a first pressure. Further, the at least one first fluid may be at least one of a carbon dioxide liquid and a carbon dioxide gas. Further, the at least one first container may be configured for transferring the at least one first fluid to at least one second container using at least one fluid transferring mechanism based on the containing. Further, the at least one fluid transferring mechanism fluidly couples the at least one first container with the at least one second container. Further, the first pressure of the at least one first fluid may be greater than a second pressure of at least one second fluid contained in the at least one second container. Further, the at least one second container transfers the at least one second fluid to a third container based on the transferring. Further, the second pressure of the at least one second fluid may be greater than a third pressure of a third fluid contained in the third container. Further, the at least one second fluid and the third fluid may be at least one of the carbon dioxide liquid and the carbon dioxide gas. Further, the at least one second container may include at least one dewar tank. Further, the third container may include a bulk tank. Further, the at least one regulator may be operatably coupled with the at least one first container. Further, the at least one regulator may be configured for controlling a mass flow rate of the at least one first fluid transferred from the at least one first container.

Further, the transferring of the at least one first fluid to the at least one second container may be based on the controlling. Further, the controlling facilitates maintaining a differential pressure between the second pressure of the at least one second fluid and the third pressure of the third fluid within a differential pressure range. Further, the at least one regulator may include at least one sensor, a processing device, and at least one actuator. Further, the at least one sensor may be configured for generating at least one first sensor data based on detecting at least one fluid characteristic of the at least one first fluid. Further, the at least one sensor may be configured for generating at least one second sensor data based on detecting the at least one fluid characteristic of the at least one second fluid. Further, the processing device may be communicatively coupled with the at least one sensor. Further, the processing device may be configured for analyzing the at least one first sensor data and the at least one second sensor data. Further, the processing device may be configured for determining a required amount of the mass flow rate of the at least one first fluid for the maintaining of the differential pressure between the second pressure and the third pressure based on the analyzing. Further, the processing device may be configured for generating a command for the transferring of the at least one first fluid to the at least one second container based on the determining. Further, the at least one actuator may be operatably coupled with the at least one first container. Further, the at least one actuator may be communicatively coupled with the processing device. Further, the at least one actuator may be configured for transitioning to a plurality of states for allowing the transferring of the at least one first fluid with the required amount of the mass flow rate based on the command. Further, the controlling may include the allowing of the transferring of the at least one first fluid with the required amount of the mass flow rate.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
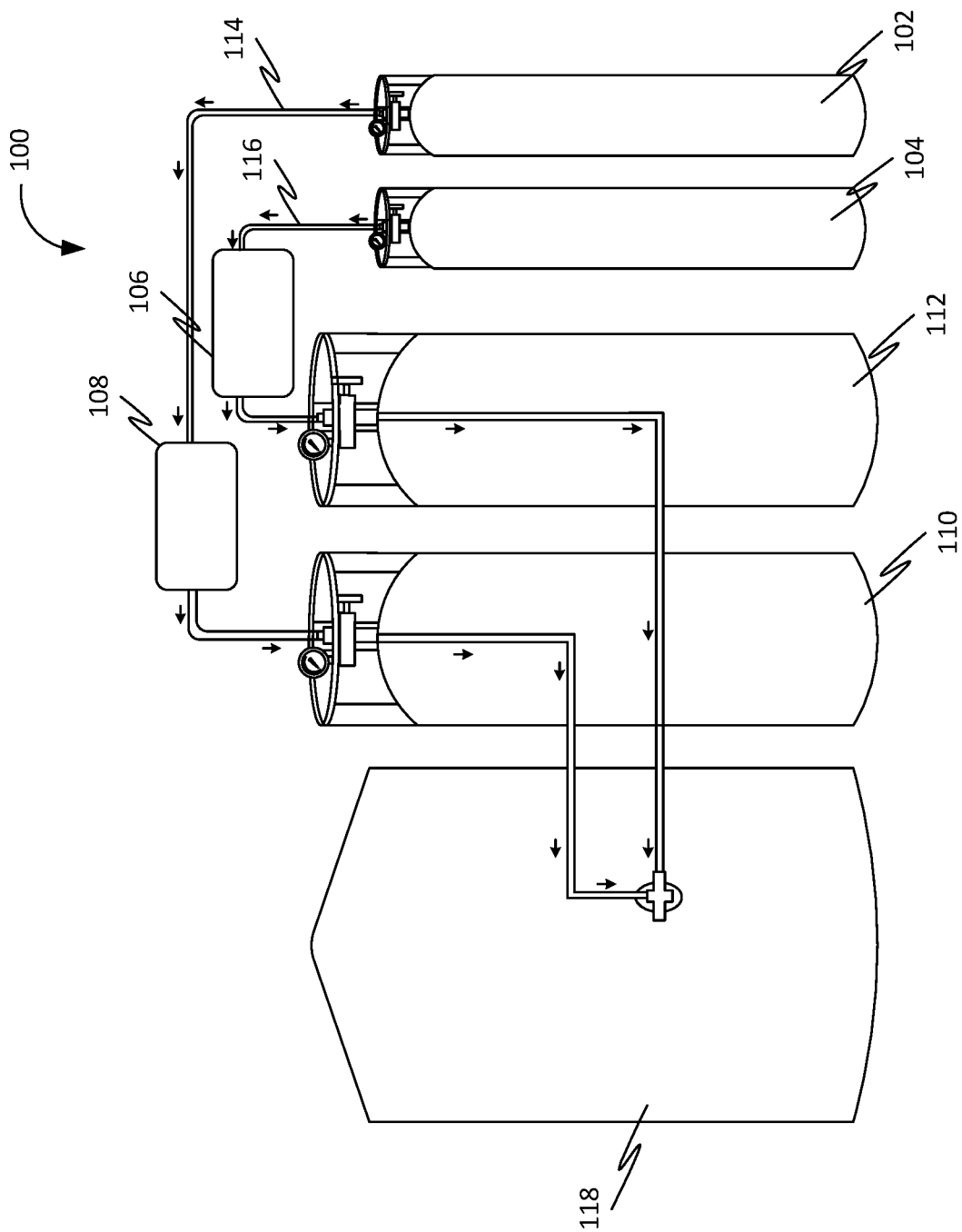
FIG. 1 is a schematic diagram of an apparatus for facilitating transferring fluids between containers, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating transferring fluids between containers, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating transferring fluids between containers.

Further, the present disclosure describes the usage of a remote fill bulk (high pressure) CO2 (carbon dioxide) system where truck filling and refilling of a bulk CO2 tank (a bulk tank) is not feasible or accessible. Further, the bulk CO2 tank may be a large bulk CO2 tank. Further, the remote fill bulk CO2 system is used for filling and refilling the bulk CO2 tank without a need for a truck or transportation. The bulk CO2 tank is refilled by CO2 dewar tanks (a dewar tank) whose head pressure may be controlled by the use of a 3rd type of tank (a high pressure CO2 gas cylinder) to ensure filling by differential pressure remains steady. Further, the CO2 dewar tanks are smaller than the bulk CO2 tank.

Further, the present disclosure describes a bulk CO2 system refilling setup. Further, the present disclosure also describes a CO2 special-effects system, a CO2 extraction system, and a bulk CO2 system. Further, the present disclosure describes a CO2 system that is designed to function to allow a refill of a bulk CO2 tank (Permamax™ 1400XHP or similar) (that is normally refilled by truck) by CO2 dewar tanks. The CO2 dewar tanks may or may not have additional high pressure CO2 gas cylinders (high pressure cylinders) with them to force head pressure into the CO2 dewar tanks to force CO2 (carbon dioxide) out faster from the CO2 dewar tanks. The bulk CO2 tank in is a micro bulk PermaMax™ 1400 XHP CO2 tank. Due to the location placement of this tank, it can not be filled by a truck. Therefore CO2 dewar tanks with sizes 160 L, 180 L, 200 L, or 450 L (liters) are used to transport liquid CO2 from a delivery area up to where the Permamax™ 1400 XHP tank is disposed. These CO2 dewar tanks are used to fill the Permamax™ 1400 XHP tank. To ensure the pressure stays as high as possible on these CO2 dewar tanks during the transfer of CO2 from the CO2 dewar tanks to the Permamax™ 1400 XHP, the high pressure CO2 cylinder(s) are used in conjunction with each CO2 dewar tank, with CO2 gas from the high pressure CO2 cylinder regulated down to the appropriate amount of pressure not to exceed the max. working pressure of the CO2 dewar tanks. The CO2 gas is fed into the vent or gas valve of the CO2 dewar tanks after the regulation. Further, the CO2 gas from the high pressure CO2 cylinder passes through the regulator and reaches the CO2 dewar tanks and the CO2 gas is transferred from the CO2 dewar tanks to the micro bulk Permamax™ 1400 XHP. The Permamax™ 1400 XHP CO2 tank once full, supplies the CO2 special effect system which has multiple valves, multiple CO2 hoses, and multiple outputs on the system for use in entertainment.

Further, the micro bulk PermaMax™ 1400 XHP (bulk CO2 tank) addresses extra high pressure CO2 applications. Further, the micro bulk PermaMax™ 1400 XHP allows delivery of high pressure liquid CO2 at operating pressures up to 750 psig. Further, the micro bulk PermaMax™ 1400 XHP may include an integral electric pressure build vaporizer that sustains the pressure of high liquid flows and provides rapid pressure recovery after filling.

Further, the CO2 dewar tanks may include Mega-Cyl® liquid cylinders and Laser-Cyl® liquid cylinders. Further, the Mega-Cyl® liquid cylinders are palletized cylinders that are easily transportable. Further, the Mega-Cyl® liquid cylinders are suitable in applications that require pressure of 350 psig. Further, the Laser-Cyl® liquid cylinders are suitable in applications that require pressure up to 500 psig.

Further, the use of the CO2 system for filling and refilling the bulk CO2 tank allows clients to place the bulk tank anywhere and fill it remotely with whatever number of CO2 dewar tanks is needed to achieve full status.

Further, the use of the CO2 system for filling and refilling the bulk CO2 tank allows the bulk CO2 tank to be placed anywhere including inside buildings and away from 20-25 feet street accesses, which is required for truck filling of the bulk CO2 tank.

Further, the use of the CO2 system for filling and refilling the bulk CO2 tank saves money compared to hard piping and other methods of relocating CO2 to the bulk CO2 tank if a truck is not able to access the bulk CO2 tank.

Further, the use of the CO2 system for filling and refilling the bulk CO2 tank provides direct access to high pressure liquid CO2 at the coldest temperatures since the bulk CO2 tank can now be placed anywhere closest to the desired usage with minimal piping, hoses, or travel distance for the output of the liquid CO2, which loses temperature and pressure the farther it travels.

Further, the use of the CO2 system for filling and refilling the bulk CO2 tank allows the customer more control over the CO2 filling and refilling process without waiting for a company to fill the tank (and ultimately deliver CO2 dewar tanks as well). DOT regulation states a hazmat license is required for transport of 1000 lbs of CO2 or more and the CO2 dewar tanks are only 750-950 lbs for certain models, so a customer could pick up a CO2 dewar tank themselves from a gas company and transport it while still remaining within the law, to use it to fill their bulk tank without waiting for the gas company.

Further, the present disclosure describes a technic of filling the bulk CO2 tank by use of smaller tanks, which are ultimately used to transport the liquid CO2 between vehicle access and the bulk tank location.

Further, the present disclosure describes the usage of a combination of tanks together to conduct the full operation (CO2 dewar tanks to fill, high pressure CO2 gas cylinders to keep head pressure steady on the CO2 dewar tank).

FIG. 1 is a schematic diagram of an apparatus 100 for facilitating transferring fluids between containers, in accordance with some embodiments. Accordingly, the apparatus 100 may include at least one first container 102-104 and at least one regulator 106-108.

Further, the at least one first container 102-104 may be configured for containing at least one first fluid at a first pressure. Further, the at least one first fluid may include a carbon dioxide (CO2) gas, a carbon dioxide (CO2) liquid, or a combination of both. Further, the at least one first container 102-104 may be configured for transferring the at least one first fluid to at least one second container 110-112 using at least one fluid transferring mechanism 114-116 based on the containing. Further, the at least one fluid transferring mechanism 114-116 fluidly couples the at least one first container 102-104 with the at least one second container 110-112. Further, the at least one fluid transferring mechanism 114-116 may include a pipe, a vent, a valve, etc. Further, the first pressure of the at least one first fluid may be greater than a second pressure of at least one second fluid contained in the at least one second container 110-112. Further, the at least one second fluid may include the carbon dioxide (CO2) gas, the carbon dioxide (CO2) liquid, or the combination of both. Further, the at least one second container 110-112 transfers the at least one second fluid to a third container 118 based on the transferring. Further, the second pressure of the at least one second fluid may be greater than a third pressure of a third fluid contained in the third container 118. Further, the third fluid may include the carbon dioxide (CO2) gas, the carbon dioxide (CO2) liquid, or the combination of both.

Further, the at least one regulator 106-108 may be operatably coupled with the at least one first container 102-104. Further, the at least one regulator 106-108 may be configured for controlling a mass flow rate of the at least one first fluid transferred from the at least one first container 102-104. Further, the transferring of the at least one first fluid to the at least one second container 110-112 may be based on the controlling. Further, the controlling facilitates maintaining a differential pressure between the second pressure of the at least one second fluid and the third pressure of the third fluid within a differential pressure range.

Figure 2:
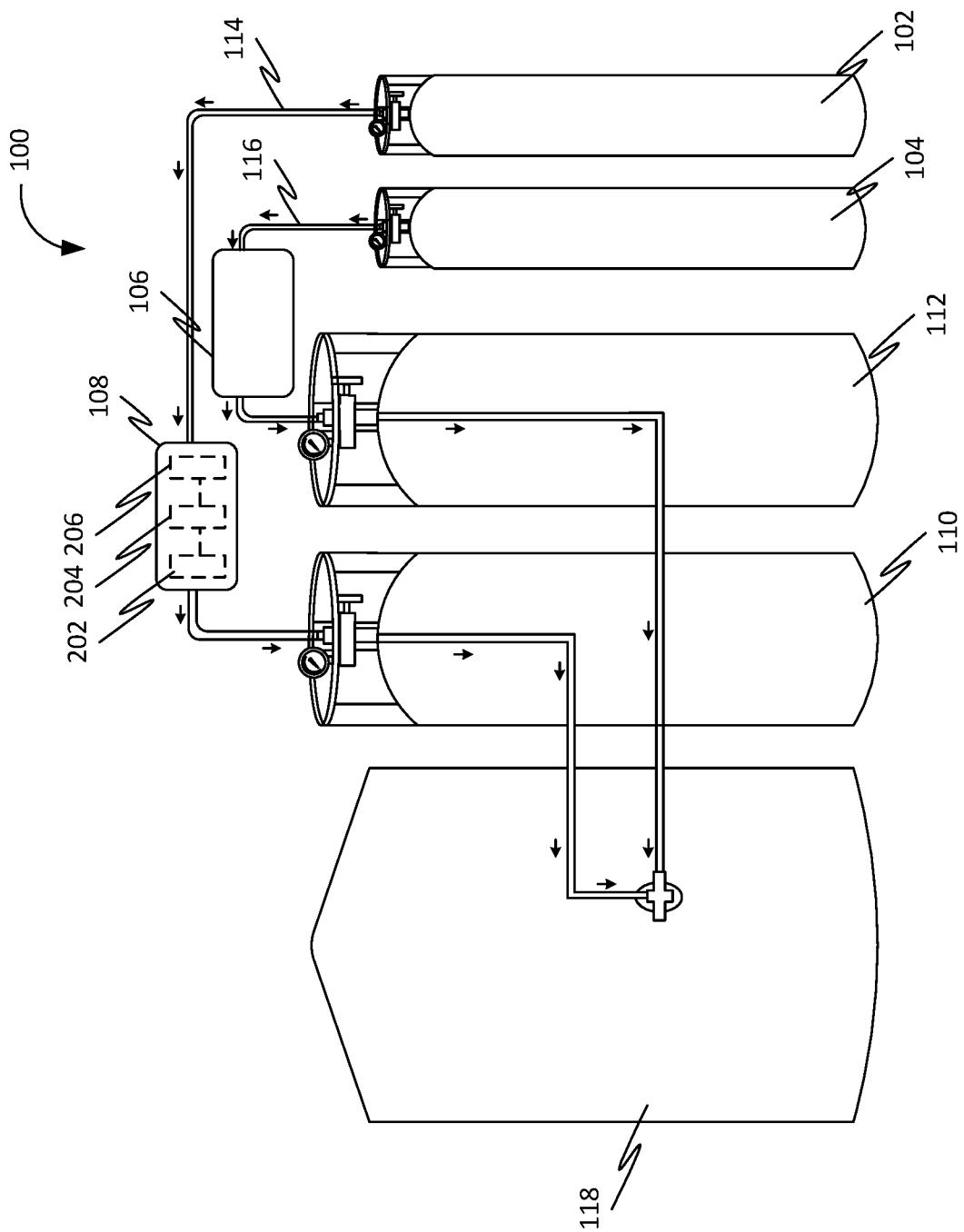
FIG. 2 is a schematic diagram of the apparatus, in accordance with some embodiments.

Further, in some embodiments, the at least one regulator 106-108 may include at least one sensor 202, a processing device 204, and at least one actuator 206, as shown in FIG. 2. Further, the at least one sensor 202 may be configured for generating at least one first sensor data based on detecting at least one fluid characteristic of the at least one first fluid. Further, the at least one fluid characteristic may include a pressure, a temperature, a volume, etc. Further, the at least one sensor 202 may be configured for generating at least one second sensor data based on detecting the at least one fluid characteristic of the at least one second fluid. Further, the processing device 204 may be communicatively coupled with the at least one sensor 202. Further, the processing device 204 may be configured for analyzing the at least one first sensor data and the at least one second sensor data. Further, the processing device 204 may be configured for determining a required amount of the mass flow rate of the at least one first fluid for the maintaining of the differential pressure between the second pressure and the third pressure based on the analyzing. Further, the processing device 204 may be configured for generating a command for the transferring of the at least one first fluid to the at least one second container 110-112 based on the determining. Further, the at least one actuator 206 may be operatably coupled with the at least one first container 102-104. Further, the at least one actuator 206 may be communicatively coupled with the processing device 204. Further, the at least one actuator 206 may be configured for transitioning to one of a plurality of states for allowing the transferring of the at least one first fluid with the required amount of the mass flow rate based on the command. Further, the plurality of states corresponds to a plurality of amounts of the mass flow rate. Further, the controlling may include the allowing of the transferring of the at least one first fluid with the required amount of the mass flow rate. Further, the at least one actuator 206 may be an electrically actuable valve. Further, the electrically actuable valve may be coupled with the pipe of the at least one fluid transferring mechanism 114-116. Further, the electrically actuable valve controls the mass flow rate of the at least one first fluid transferred through the pipe in one of the plurality of amounts of the flow rate based on the transitioning to the one of the plurality of states. Further, in an instance, the at least one sensor 202 may be an IoT sensor. Further, the least one sensor 202 may be connected to a cloud server (such as the server computer) using at least one of a transmitter and a receiver. Further, the least one sensor 202 transmits the at least one first sensor data and the at least one second sensor data to the cloud server using the transmitter.

Figure 3:
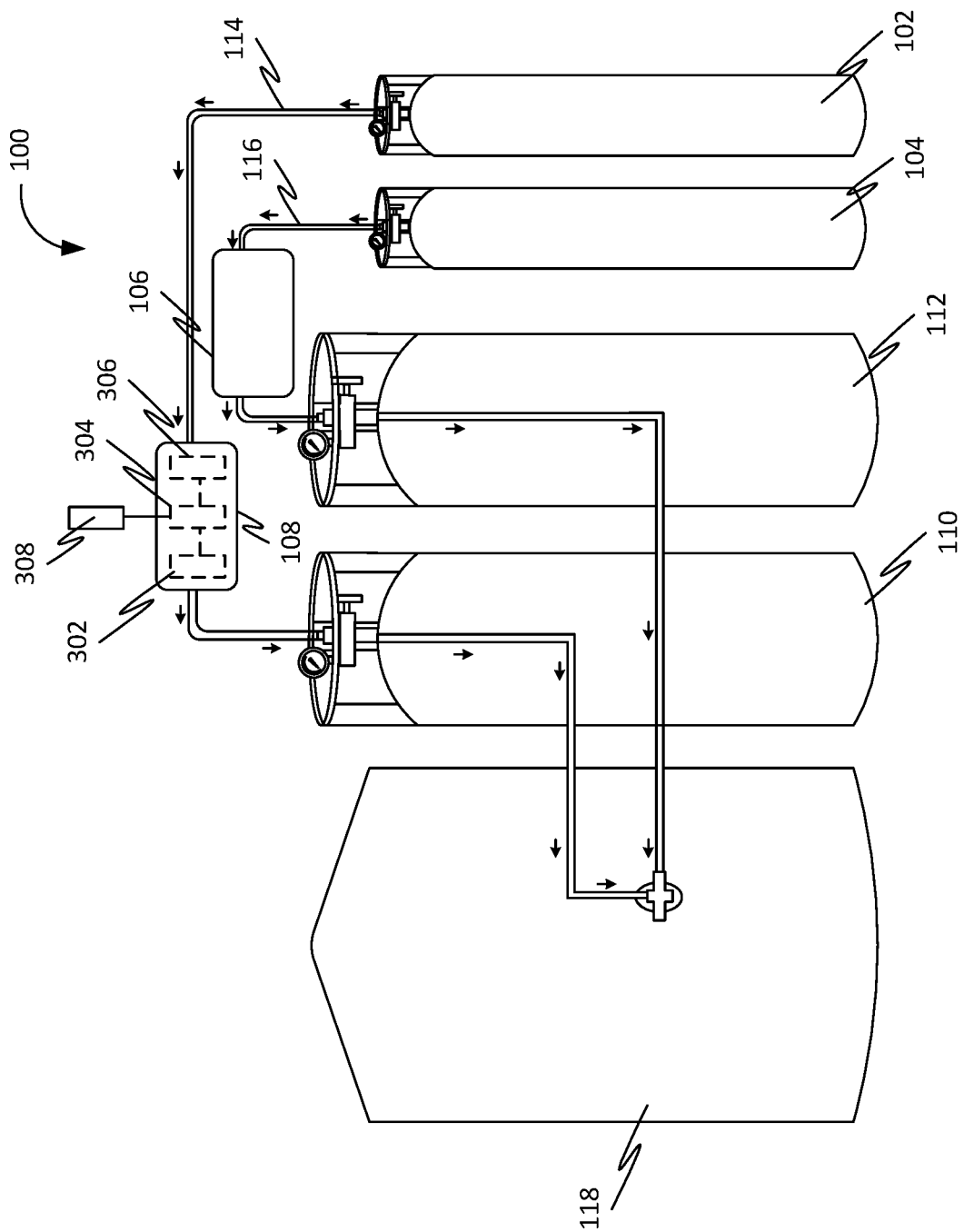
FIG. 3 is a schematic diagram of the apparatus, in accordance with some embodiments.

In further embodiments, the apparatus 100 may include at least one third sensor 308, as shown in FIG. 3. Further, the at least one third sensor 308 may be configured for generating at least one third sensor data based on detecting at least one characteristic of the at least one second container 110-112. Further, the at least one characteristic may include an operating pressure, an operating volume, an operating temperature, etc. of the at least one second container 110-112. Further, the at least one regulator 106-108 may include at least one sensor 302, a processing device 304, and at least one actuator 306, as shown in FIG. 3. Further, the at least one sensor 302 may be configured for generating at least one first sensor data based on detecting at least one fluid characteristic of the at least one first fluid. Further, the at least one fluid characteristic may include a pressure, a temperature, a volume, etc. Further, the processing device 304 may be communicatively coupled with the at least one third sensor 308 and the at least one sensor 302. Further, the processing device 304 may be configured for analyzing the at least one first sensor data and the at least one third sensor data based on at least one second criterion. Further, the at least one second criterion may include a maximum operating pressure, a maximum operating volume, a maximum operating temperature, etc. of the at least one second container 110-112. Further, the processing device 304 may be configured for determining a required amount of the mass flow rate of the at least one first fluid based on the analyzing. Further, the processing device 304 may be configured for generating a command for the transferring of the at least one first fluid to the at least one second container 110-112 based on the determining. Further, the at least one actuator 306 may be operatably coupled with the at least one first container 102-104. Further, the at least one actuator 306 may be communicatively coupled with the processing device 304. Further, the at least one actuator 306 may be configured for transitioning to one of a plurality of states for allowing the transferring of the at least one first fluid with the required amount of the mass flow rate based on the command. Further, the plurality of states corresponds to a plurality of amounts of the mass flow rate. Further, the controlling may include the allowing of the transferring of the at least one first fluid with the required amount of the mass flow rate. Further, in an instance, the at least one sensor 302 may be an IoT sensor. Further, the least one sensor 302 may be connected to a cloud server (such as the server computer) using at least one of a transmitter and a receiver. Further, the least one sensor 302 transmits the at least one first sensor data to the cloud server using the transmitter. Further, in an instance, the at least one third sensor 308 may be an IoT sensor. Further, the least one third sensor 308 may be connected to the cloud server (such as the server computer) using at least one of the transmitter and the receiver. Further, the least one third sensor 308 transmits the at least one third sensor data to the cloud server using the transmitter.

Figure 4:
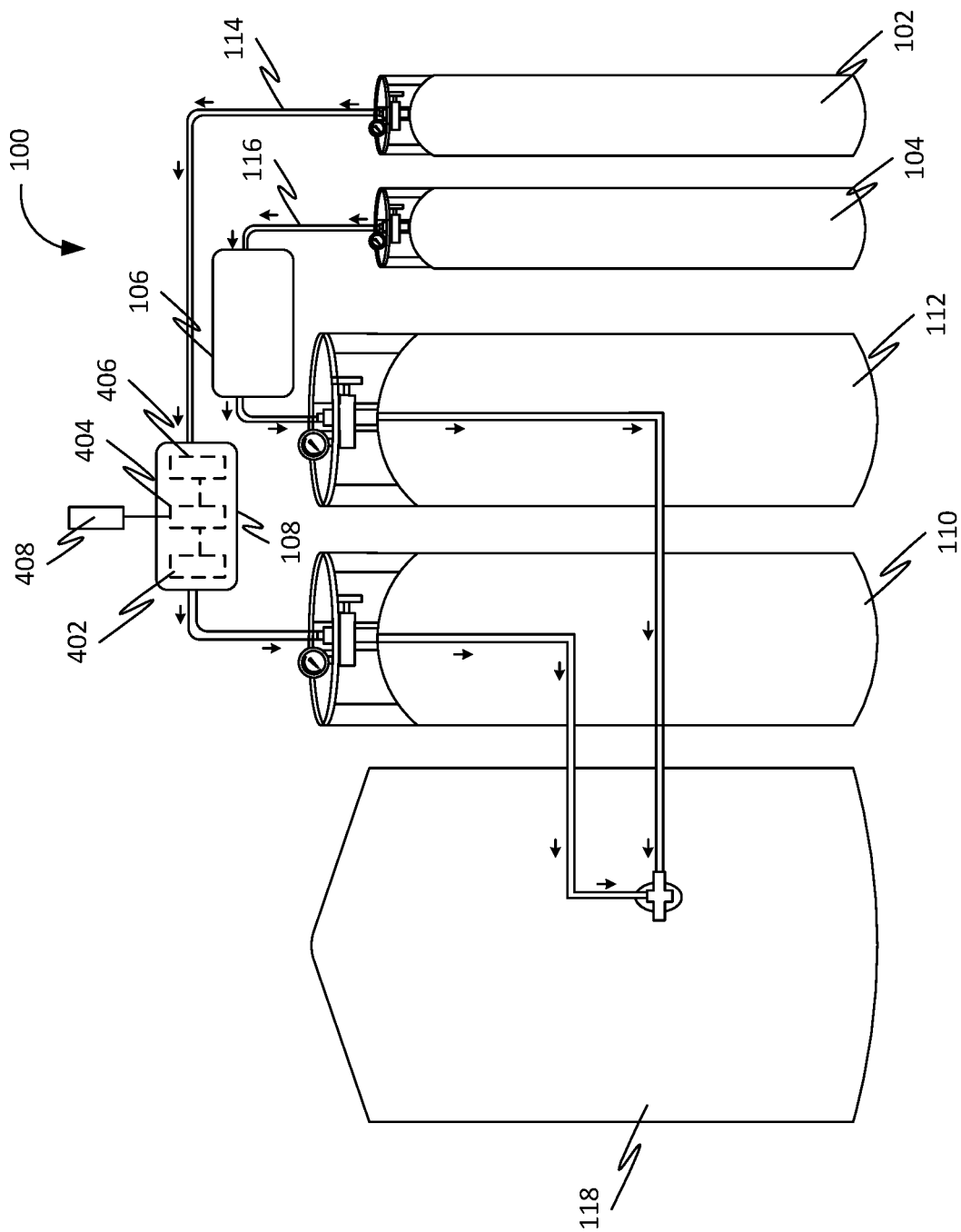
FIG. 4 is a schematic diagram of the apparatus, in accordance with some embodiments.

In further embodiments, the apparatus 100 may include at least one fourth sensor 408, as shown in FIG. 4. Further, the at least one fourth sensor 408 may be configured for generating at least one fourth sensor data based on detecting at least one fluid characteristic of the third fluid. Further, the at least one fluid characteristic may include a pressure, a temperature, a volume, etc. Further, the at least one regulator 106-108 may include at least one sensor 402, a processing device 404, and at least one actuator 406, as shown in FIG. 4. Further, the at least one sensor 402 may be configured for generating at least one first sensor data based on detecting the at least one fluid characteristic of the at least one first fluid. Further, the processing device 404 may be communicatively coupled with the at least one fourth sensor 408 and the at least one sensor 402. Further, the processing device 404 may be configured for analyzing the at least one first sensor data and the at least one fourth sensor data. Further, the processing device 404 may be configured for determining a required amount of the mass flow rate of the at least one first fluid based on the analyzing. Further, the processing device 404 may be configured for generating a command for the transferring of the at least one first fluid to the at least one second container 110-112 based on the determining. Further, the at least one actuator 406 may be operatably coupled with the at least one first container 102-104. Further, the at least one actuator 406 may be communicatively coupled with the processing device 404. Further, the at least one actuator 406 may be configured for transitioning to one of a plurality of states for allowing the transferring the at least one first fluid with the required amount of the mass flow rate based on the command. Further, the plurality of states corresponds to a plurality of amounts of the mass flow rate. Further, the controlling may include the allowing of the transferring of the at least one first fluid with the required amount of the mass flow rate. Further, in an instance, the at least one sensor 402 may be an IoT sensor. Further, the least one sensor 402 may be connected to a cloud server (such as the server computer) using at least one of a transmitter and a receiver. Further, the least one sensor 402 transmits the at least one first sensor data to the cloud server using the transmitter. Further, in an instance, the at least one fourth sensor 408 may be an IoT sensor. Further, the least one fourth sensor 408 may be connected to the cloud server (such as the server computer) using at least one of the transmitter and the receiver. Further, the least one fourth sensor 408 transmits the at least one fourth sensor data to the cloud server using the transmitter.

Figure 5:
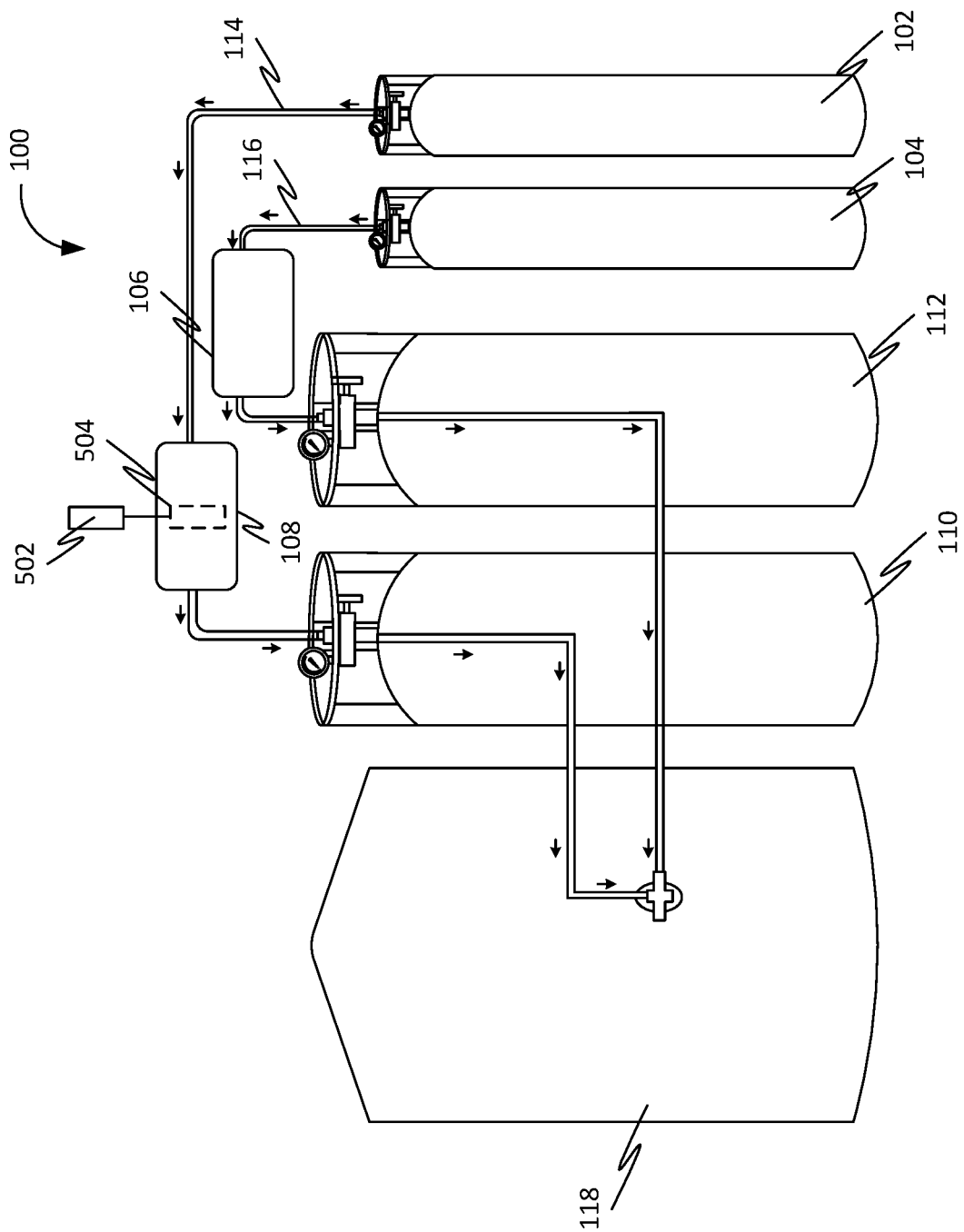
FIG. 5 is a schematic diagram of the apparatus, in accordance with some embodiments.

In further embodiments, the apparatus 100 may include at least one fifth sensor 502, as shown in FIG. 5. Further, the at least one fifth sensor 502 may be configured for generating at least one fifth sensor data based on detecting at least one fluid characteristic of the third fluid. Further, the at least one fluid characteristic may include a pressure, a temperature, a volume, etc. Further, the at least one regulator 106-108 may include a processing device 504, as shown in FIG. 5, communicatively coupled with the at least one fifth sensor 502. Further, the processing device 504 may be configured for analyzing the at least one fifth sensor data. Further, the processing device 504 may be configured for determining the differential pressure range for the differential pressure based on the analyzing. Further, the maintaining of the differential pressure between the second pressure of the at least one second fluid and the third pressure of the third fluid within the differential pressure range may be based on the determining. Further, in an instance, the at least one fifth sensor 502 may be an IoT sensor. Further, the least one fifth sensor 502 may be connected to the cloud server (such as the server computer) using at least one of the transmitter and the receiver. Further, the least one fifth sensor 502 transmits the at least one fifth sensor data to the cloud server using the transmitter.

Figure 6:
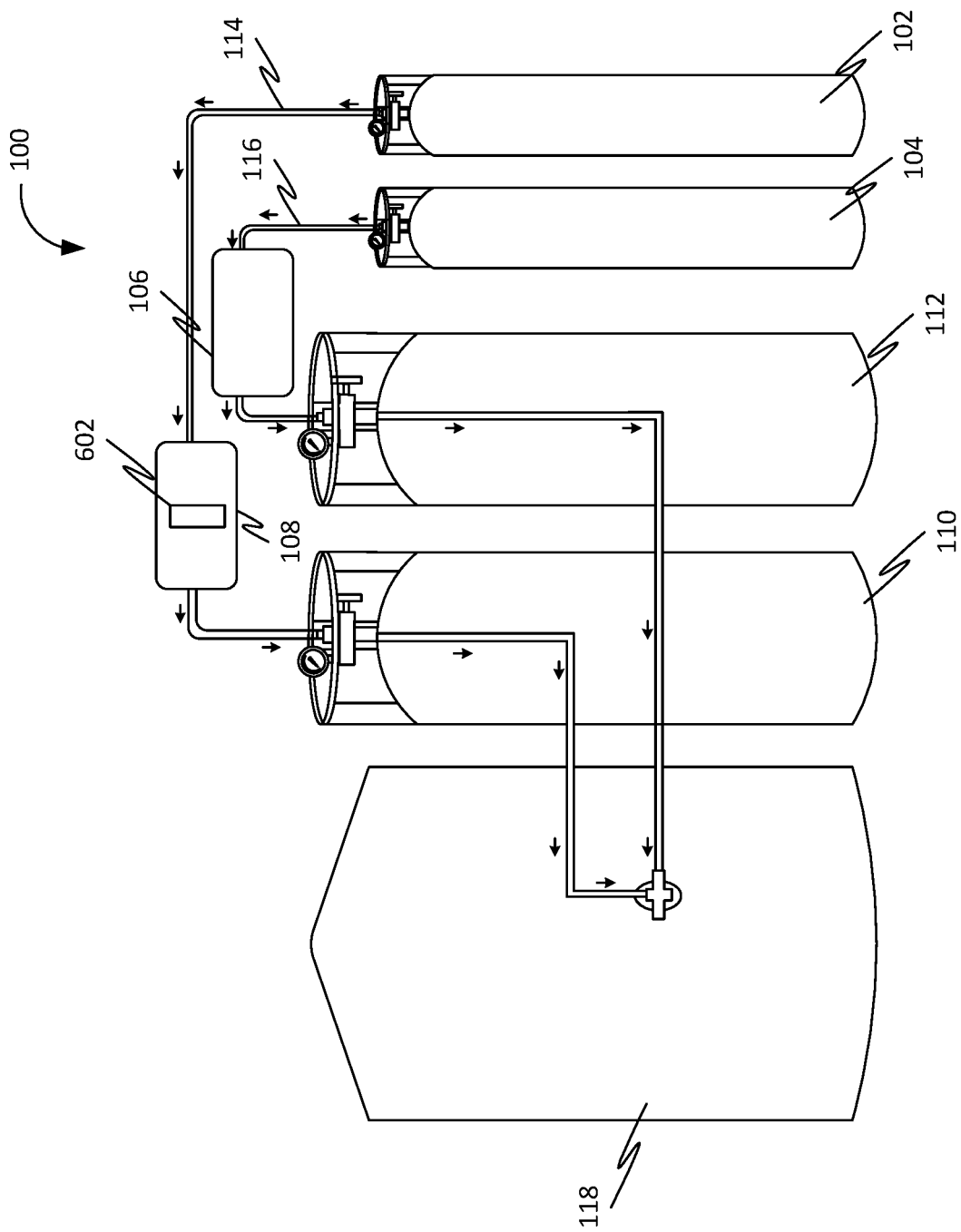
FIG. 6 is a schematic diagram of the apparatus, in accordance with some embodiments.

Further, in some embodiments, the at least one regulator 106-108 may include at least one input device 602, as shown in FIG. 6. Further, the at least one input device may incude a keypad, a touch screen, a computing device, etc. Further, the at least one input device 602 may be configured for receiving the differential pressure range. Further, the maintaining of the differential pressure between the second pressure of the at least one second fluid and the third pressure of the third fluid within the differential pressure range may be based on the receiving of the differential pressure range.

Further, in some embodiments, at least one of the at least one first fluid, the at least one second fluid, and the third fluid may be at least one of a carbon dioxide liquid and a carbon dioxide gas.

Further, in some embodiments, the at least one first container 102-104 may be associated with at least one first container volume. Further, the at least one second container 110-112 may be associated with at least one second container volume. Further, the third container 118 may be associated with a third container volume. Further, the at least one second volume may be greater than the at least one first volume. Further, the third volume may be greater than the at least one second volume.

Further, in some embodiments, the at least one first container 102-104 may include at least one high pressure cylinder. Further, the at least one second container 110-112 may include at least one dewar tank. Further, the third container 118 may include a bulk tank.

Further, in some embodiments, the at least one first container 102-104 and the at least one second container 110-112 may be transportable. Further, the third container 118 may be not transportable.

FIG. 2 is a schematic diagram of the apparatus 100, in accordance with some embodiments.

FIG. 3 is a schematic diagram of the apparatus 100, in accordance with some embodiments.

FIG. 4 is a schematic diagram of the apparatus 100, in accordance with some embodiments.

FIG. 5 is a schematic diagram of the apparatus 100, in accordance with some embodiments.

FIG. 6 is a schematic diagram of the apparatus 100, in accordance with some embodiments.

Figure 7:
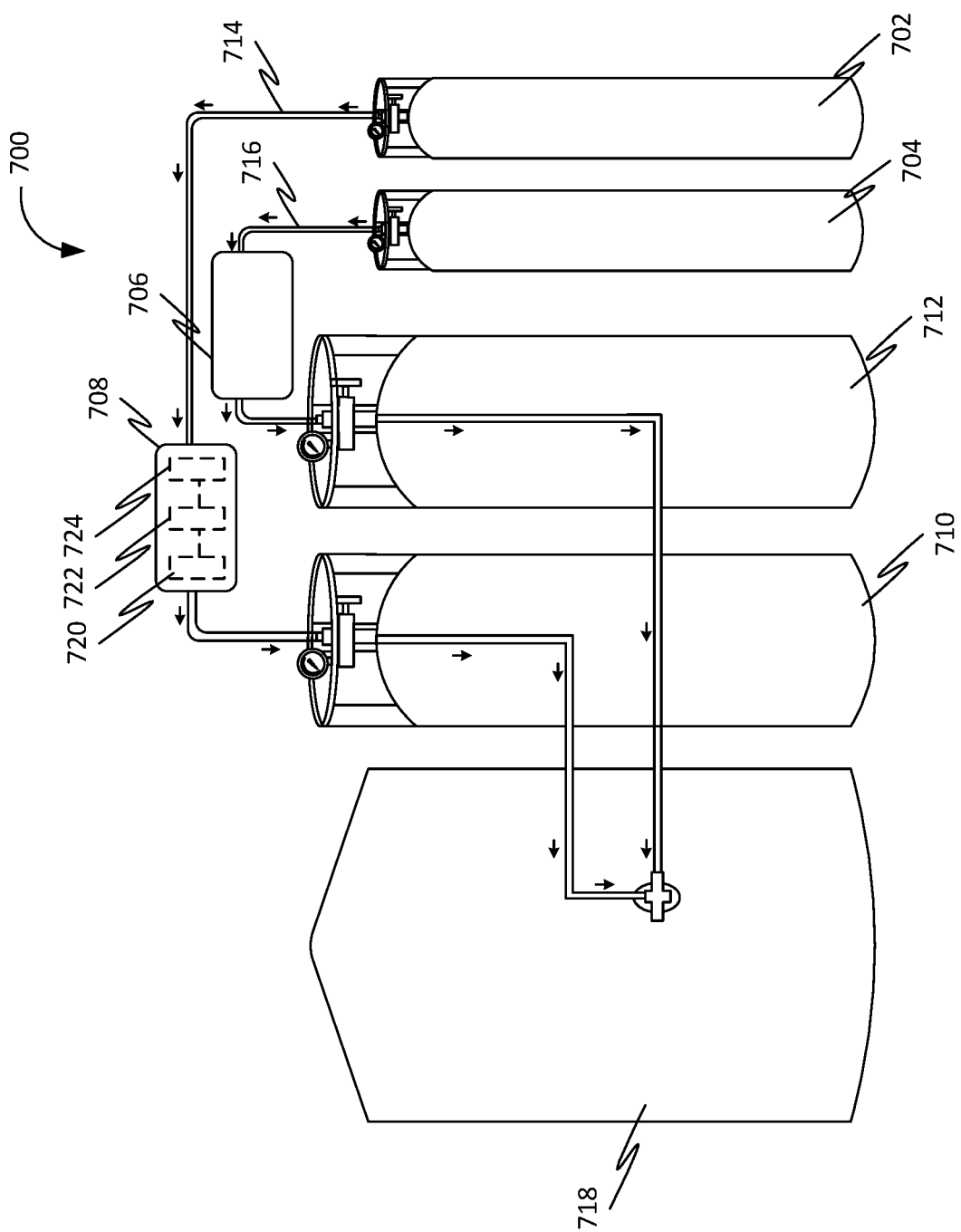
FIG. 7 is a schematic diagram of an apparatus for facilitating transferring fluids between containers, in accordance with some embodiments.

FIG. 7 is a schematic diagram of an apparatus 700 for facilitating transferring fluids between containers, in accordance with some embodiments. Accordingly, the apparatus 700 may include at least one first container 702-704 and at least one regulator 706-708.

Further, the at least one first container 702-704 may be configured for containing at least one first fluid at a first pressure. Further, the at least one first fluid may include a carbon dioxide (CO2) gas, a carbon dioxide (CO2) liquid, or a combination of both. Further, the at least one first container 702-704 may be configured for transferring the at least one first fluid to at least one second container 710-712 using at least one fluid transferring mechanism 714-716 based on the containing. Further, the at least one fluid transferring mechanism 714-716 fluidly couples the at least one first container 702-704 with the at least one second container 710-712. Further, the first pressure of the at least one first fluid may be greater than a second pressure of at least one second fluid contained in the at least one second container 710-712. Further, the at least one second fluid may include the carbon dioxide (CO2) gas, the carbon dioxide (CO2) liquid, or the combination of both. Further, the at least one second container 710-712 transfers the at least one second fluid to a third container 718 based on the transferring. Further, the second pressure of the at least one second fluid may be greater than a third pressure of a third fluid contained in the third container 718. Further, the third fluid may include the carbon dioxide (CO2) gas, the carbon dioxide (CO2) liquid, or the combination of both.

Further, the at least one regulator 706-708 may be operatably coupled with the at least one first container 702-704. Further, the at least one regulator 706-708 may be configured for controlling a mass flow rate of the at least one first fluid transferred from the at least one first container 702-704. Further, the transferring of the at least one first fluid to the at least one second container 710-712 may be based on the controlling. Further, the controlling facilitates maintaining a differential pressure between the second pressure of the at least one second fluid and the third pressure of the third fluid within a differential pressure range. Further, the at least one regulator 706-708 may include at least one sensor 720, a processing device 722, and at least one actuator 724. Further, the at least one sensor 720 may be configured for generating at least one first sensor data based on detecting at least one fluid characteristic of the at least one first fluid. Further, the at least one sensor 720 may be configured for generating at least one second sensor data based on detecting the at least one fluid characteristic of the at least one second fluid. Further, the processing device 722 may be communicatively coupled with the at least one sensor 720. Further, the processing device 722 may be configured for analyzing the at least one first sensor data and the at least one second sensor data. Further, the processing device 722 may be configured for determining a required amount of the mass flow rate of the at least one first fluid for the maintaining of the differential pressure between the second pressure and the third pressure based on the analyzing. Further, the processing device 722 may be configured for generating a command for the transferring of the at least one first fluid to the at least one second container 710-712 based on the determining. Further, the at least one actuator 724 may be operatably coupled with the at least one first container 702-704. Further, the at least one actuator 724 may be communicatively coupled with the processing device 722. Further, the at least one actuator 724 may be configured for transitioning to one of a plurality of states for allowing the transferring of the at least one first fluid with the required amount of the mass flow rate based on the command. Further, the plurality of states corresponds to a plurality of amounts of the mass flow rate. Further, the controlling may include the allowing of the transferring of the at least one first fluid with the required amount of the mass flow rate.

In further embodiments, the apparatus 700 may include at least one third sensor. Further, the at least one third sensor may be configured for generating at least one third sensor data based on detecting at least one characteristic of the at least one second container 710-712. Further, the processing device 722 may be communicatively coupled with the at least one third sensor. Further, the processing device 722 may be further configured for analyzing the at least one third sensor data based on at least one second criterion. Further, the determining of the required amount of the mass flow rate of the at least one first fluid may be further based on the analyzing of the at least one first sensor data and the analyzing of the at least one third sensor data.

In further embodiments, the apparatus 700 may include at least one fourth sensor. Further, the at least one fourth sensor may ne configured for generating at least one fourth sensor data based on detecting the at least one fluid characteristic of the third fluid. Further, the processing device 722 may be communicatively coupled with the at least one fourth sensor. Further, the processing device 722 may be further configured for analyzing the at least one fourth sensor data. Further, the determining of the required amount of the mass flow rate of the at least one first fluid based on the analyzing of the at least one fourth sensor data and the analyzing of the at least one first sensor data.

In further embodiments, the apparatus 700 may include at least one fifth sensor. Further, the at least one fifth sensor may be configured for generating at least one fifth sensor data based on detecting the at least one fluid characteristic of the third fluid. Further, the processing device 722 may be communicatively coupled with the at least one fifth sensor. Further, the processing device 722 may be configured for analyzing the at least one fifth sensor data. Further, the processing device 722 may be configured for determining the differential pressure range for the differential pressure based on the analyzing. Further, the maintaining of the differential pressure between the second pressure of the at least one second fluid and the third pressure of the third fluid within the differential pressure range based on the determining.

Further, in some embodiments, the at least one regulator 706-708 may include at least one input device. Further, the at least one input device may be configured for receiving the differential pressure range. Further, the maintaining of the differential pressure between the second pressure of the at least one second fluid and the third pressure of the third fluid within the differential pressure range may be based on the receiving of the differential pressure range.

Further, in some embodiments, at least one of the at least one first fluid, the at least one second fluid, and the third fluid may be at least one of a carbon dioxide liquid and a carbon dioxide gas.

Further, in some embodiments, the at least one first container 702-704 may be associated with at least one first container volume. Further, the at least one second container 710-712 may be associated with at least one second container volume. Further, the third container 718 may be associated with a third container volume. Further, the at least one second volume may be greater than the at least one first volume. Further, the third volume may be greater than the at least one second volume.

Further, in some embodiments, the at least one first container 702-704 may include at least one high pressure cylinder. Further, the at least one second container 710-712 may include at least one dewar tank. Further, the third container 718 may include a bulk tank.

Further, in some embodiments, the at least one first container 702-704 and the at least one second container 710-712 may be transportable. Further, the third container 718 may be not transportable.

Figure 8:
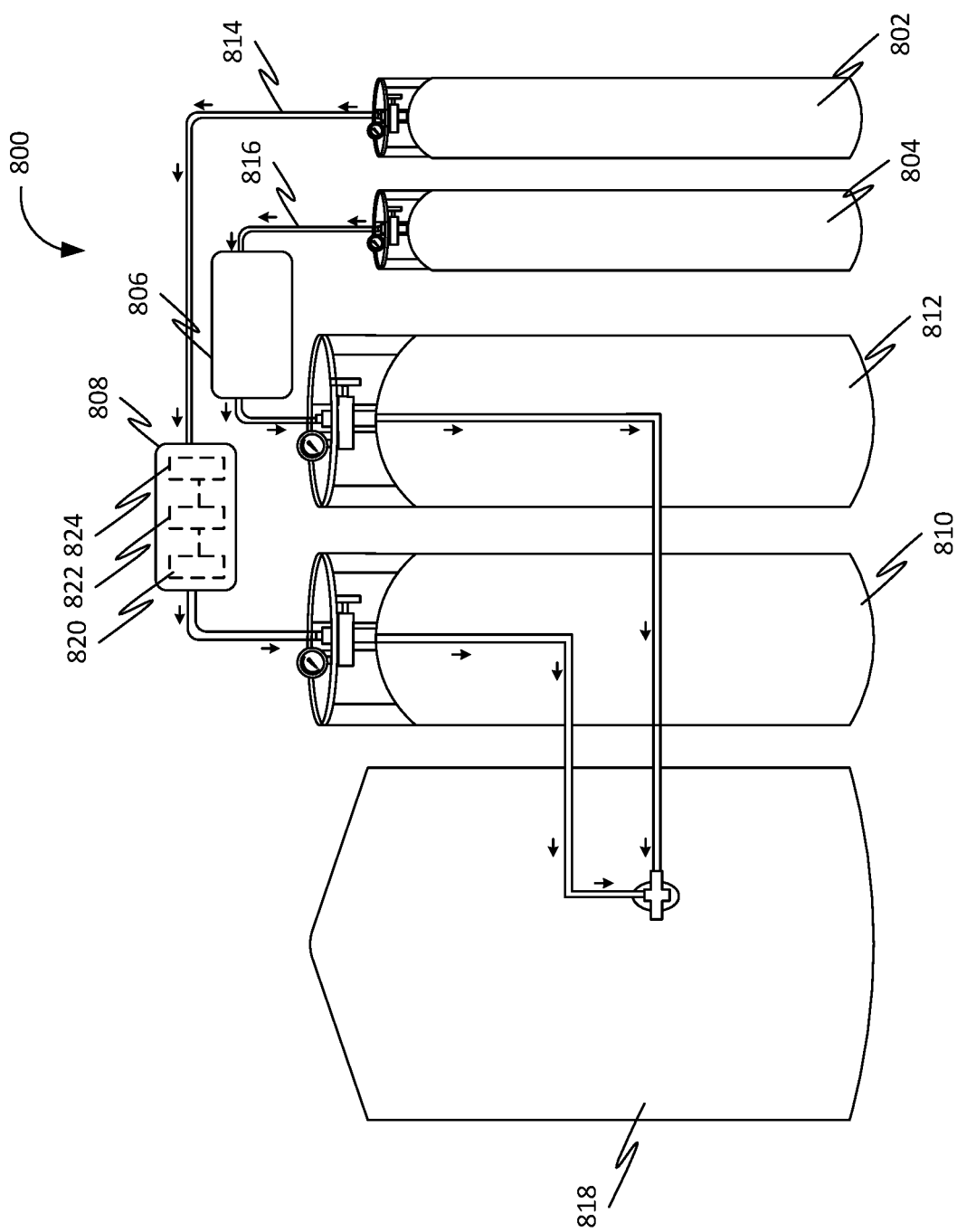
FIG. 8 is a schematic diagram of an apparatus for facilitating transferring fluids between containers, in accordance with some embodiments.

FIG. 8 is a schematic diagram of an apparatus 800 for facilitating transferring fluids between containers, in accordance with some embodiments. Accordingly, the apparatus 800 may include at least one first container 802-804 and at least one regulator 806-808.

Further, the at least one first container 802-804 may include at least one high pressure tank. Further, the at least one first container 802-804 may be configured for containing at least one first fluid at a first pressure. Further, the at least one first fluid may be at least one of a carbon dioxide liquid and a carbon dioxide gas. Further, the at least one first container 802-804 may be configured for transferring the at least one first fluid to at least one second container 810-812 using at least one fluid transferring mechanism 814-816 based on the containing. Further, the at least one fluid transferring mechanism 814-816 fluidly couples the at least one first container 802-804 with the at least one second container 810-812. Further, the first pressure of the at least one first fluid may be greater than a second pressure of at least one second fluid contained in the at least one second container 810-812. Further, the at least one second fluid may include the carbon dioxide (CO2) gas, the carbon dioxide (CO2) liquid, or the combination of both. Further, the at least one second container 810-812 transfers the at least one second fluid to a third container 818 based on the transferring. Further, the second pressure of the at least one second fluid may be greater than a third pressure of a third fluid contained in the third container 818. Further, the at least one second fluid and the third fluid may be at least one of the carbon dioxide liquid and the carbon dioxide gas. Further, the at least one second container 810-812 may include at least one dewar tank. Further, the third container 818 may include a bulk tank.

Further, the at least one regulator 806-808 may be operatably coupled with the at least one first container 802-804. Further, the at least one regulator 806-808 may be configured for controlling a mass flow rate of the at least one first fluid transferred from the at least one first container 802-804. Further, the transferring of the at least one first fluid to the at least one second container 810-812 may be based on the controlling. Further, the controlling facilitates maintaining a differential pressure between the second pressure of the at least one second fluid and the third pressure of the third fluid within a differential pressure range. Further, the at least one regulator 806-808 may include at least one sensor 820, a processing device 822, and at least one actuator 824. Further, the at least one sensor 820 may be configured for generating at least one first sensor data based on detecting at least one fluid characteristic of the at least one first fluid. Further, the at least one sensor 820 may be configured for generating at least one second sensor data based on detecting the at least one fluid characteristic of the at least one second fluid. Further, the processing device 822 may be communicatively coupled with the at least one sensor 820. Further, the processing device 822 may be configured for analyzing the at least one first sensor data and the at least one second sensor data. Further, the processing device 822 may be configured for determining a required amount of the mass flow rate of the at least one first fluid for the maintaining of the differential pressure between the second pressure and the third pressure based on the analyzing. Further, the processing device 822 may be configured for generating a command for the transferring of the at least one first fluid to the at least one second container 810-812 based on the determining. Further, the at least one actuator 824 may be operatably coupled with the at least one first container 802-804. Further, the at least one actuator 824 may be communicatively coupled with the processing device 822. Further, the at least one actuator 824 may be configured for transitioning to one of a plurality of states for allowing the transferring of the at least one first fluid with the required amount of the mass flow rate based on the command. Further, the plurality of states corresponds to a plurality of amounts of the mass flow rate. Further, the controlling may include the allowing of the transferring of the at least one first fluid with the required amount of the mass flow rate.

Figure 9:
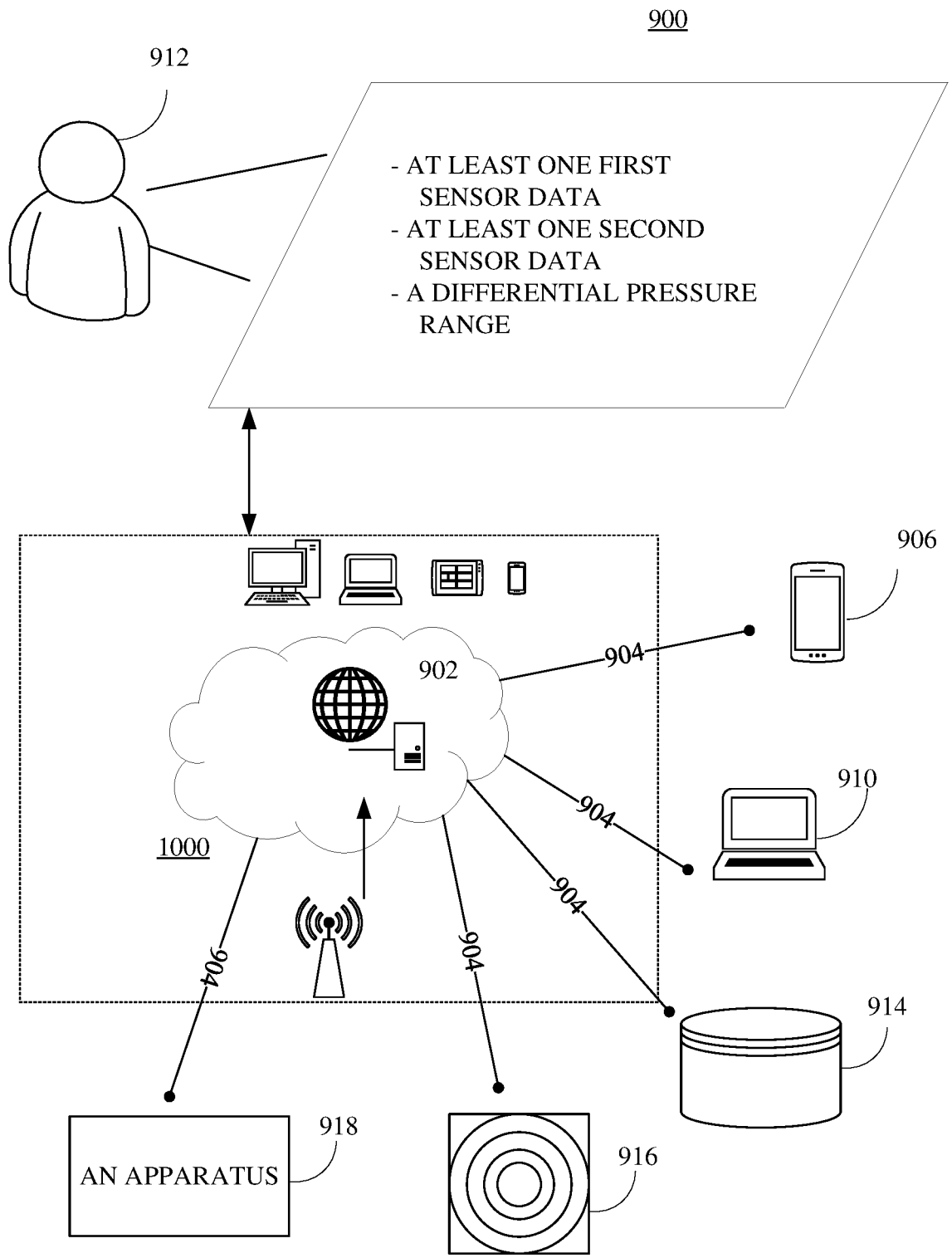
FIG. 9 is an illustration of an online platform consistent with various embodiments of the present disclosure.

FIG. 9 is an illustration of an online platform 900 consistent with various embodiments of the present disclosure. By way of non-limiting example, the online platform 900 to facilitate transferring fluids between containers may be hosted on a centralized server 902, such as, for example, a cloud computing service. The centralized server 902 may communicate with other network entities, such as, for example, a mobile device 906 (such as a smartphone, a laptop, a tablet computer, etc.), other electronic devices 910 (such as desktop computers, server computers, etc.), databases 914, sensors 916, and an apparatus 918 (such as the apparatus 100, the apparatus 700, the apparatus 800, etc.) over a communication network 904, such as, but not limited to, the Internet. Further, users of the online platform 900 may include relevant parties such as, but not limited to, end-users, administrators, service providers, service consumers, and so on. Accordingly, in some instances, electronic devices operated by the one or more relevant parties may be in communication with the platform.

A user 912, such as the one or more relevant parties, may access online platform 900 through a web based software application or browser. The web based software application may be embodied as, for example, but not be limited to, a website, a web application, a desktop application, and a mobile application compatible with a computing device 1000.

Figure 10:
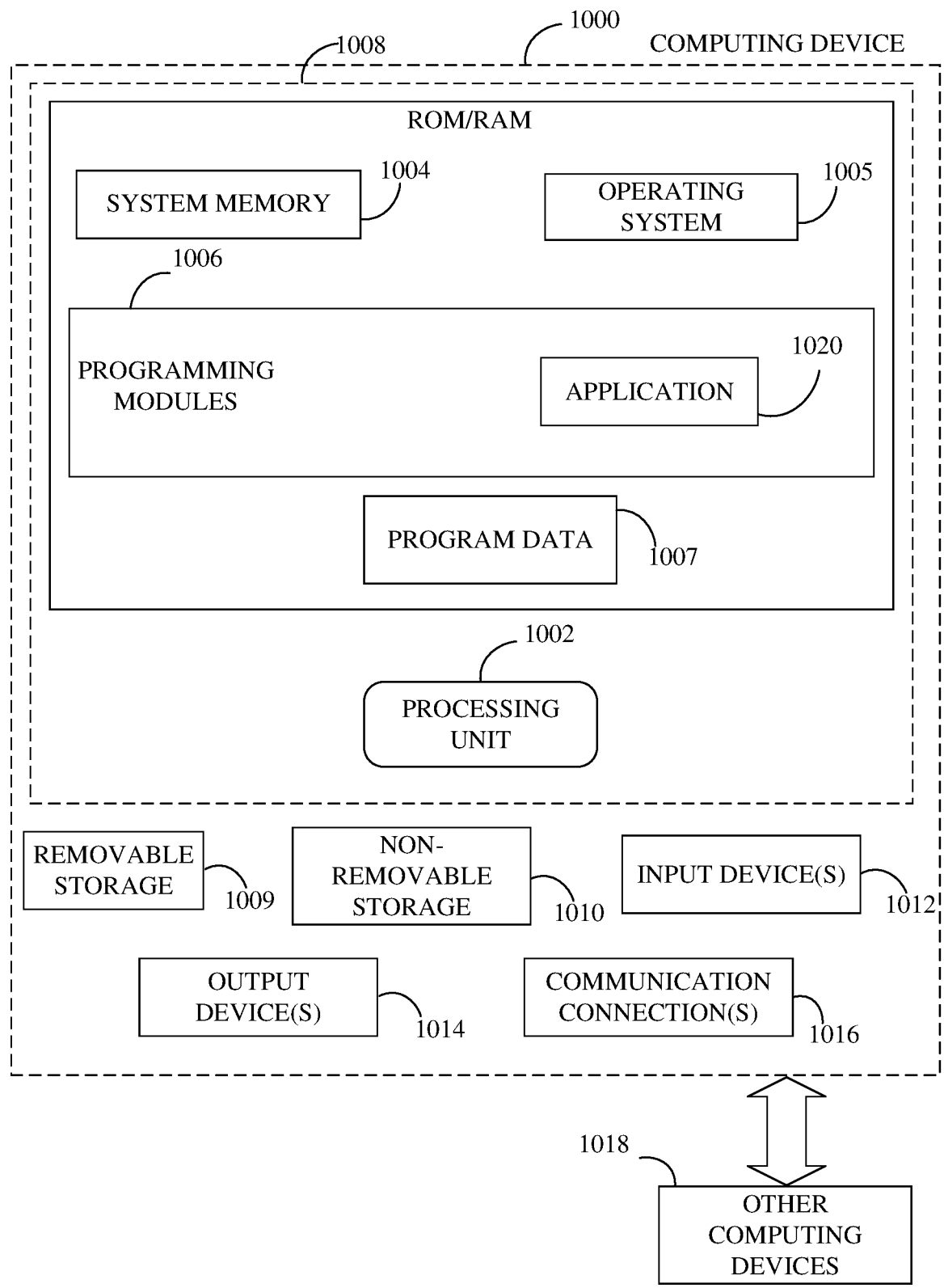
FIG. 10 is a block diagram of a computing device for implementing the methods disclosed herein, in accordance with some embodiments.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random-access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and non-volatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, a location sensor, a camera, a biometric sensor, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., application 1020 such as a media player) may perform processes including, for example, one or more stages of methods, algorithms, systems, applications, servers, databases as described above. The aforementioned process is an example, and processing unit 1002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for facilitating transferring fluids between containers, the apparatus comprising:

at least one first container configured for containing at least one first fluid, wherein the at least one first fluid comprises carbon dioxide gas, wherein the at least one first container is fluidly couplable with at least one second container using at least one fluid transferring mechanism, wherein the at least one fluid transferring mechanism comprises a pipe, wherein a first pressure in the at least one first container due to the at least one first fluid contained the at least one first container is greater than a second pressure in the at least one second container due to at least one second fluid contained in the at least one second container, wherein the at least one second fluid comprises carbon dioxide gas, wherein the at least one first fluid is transferred from the at least one first container to the at least one second container containing the at least one second fluid through the pipe based on a difference between the first pressure and the second pressure;

the at least one second container is configured for filling a third container containing a third fluid at a third pressure, with the at least one first fluid and the at least one second fluid based on maintaining the second pressure greater than the third pressure, wherein the maintaining of the second pressure greater than the third pressure is based on transferring of the at least one first fluid into the at least one second container, wherein the third fluid comprises carbon dioxide gas;

at least one regulator operatably coupled with the at least one first container, wherein the at least one regulator comprises at least one actuator, wherein the at least one actuator is coupled with the pipe, wherein the at least one regulator is configured for controlling a mass flow rate of the at least one first fluid transferred from the at least one first container to the at least one second container through the pipe, wherein the at least one actuator is configured for transitioning to one of a plurality of states for the controlling of the mass flow rate, wherein the controlling facilitates the maintaining of a differential pressure between the second pressure and the third pressure within a differential pressure range; and at least one fifth sensor configured for generating at least one fifth sensor data based on detecting at least one fluid characteristic of the third fluid, wherein the at least one fluid characteristic comprises at least one of a pressure, a temperature, and a volume, wherein the at least one regulator further comprises a processing device communicatively coupled with the at least one fifth sensor, wherein the processing device is configured for:

analyzing the at least one fifth sensor data; and determining the differential pressure range for the differential pressure based on the analyzing, wherein the maintaining of the differential pressure between the second pressure and the third pressure within the differential pressure range is based on the determining.

2. The apparatus of claim 1, wherein the at least one regulator further comprises:

at least one sensor configured for:

generating at least one first sensor data based on detecting at least one fluid characteristic of the at least one first fluid, wherein the at least one fluid characteristic comprises at least one of a pressure, a temperature, and a volume; and generating at least one second sensor data based on detecting the at least one fluid characteristic of the at least one second fluid; and a processing device communicatively coupled with the at least one sensor, wherein the processing device is configured for:

analyzing the at least one first sensor data and the at least one second sensor data;

determining a required amount of the mass flow rate of the at least one first fluid for the maintaining of the differential pressure between the second pressure and the third pressure based on the analyzing; and generating a command for the transferring of the at least one first fluid to the at least one second container based on the determining, wherein the at least one actuator is communicatively coupled with the processing device, wherein the at least one actuator is configured for transitioning to one of a plurality of states for allowing the transferring of the at least one first fluid with the required amount of the mass flow rate based on the command, wherein the controlling comprises the allowing of the transferring of the at least one first fluid with the required amount of the mass flow rate.

3. The apparatus of claim 1 further comprising at least one third sensor configured for generating at least one third sensor data based on detecting at least one characteristic of the at least one second container, wherein the at least one characteristic comprises at least one of an operating pressure, an operating volume, and an operating temperature of the at least one second container, wherein the at least one regulator further comprises:

at least one sensor configured for generating at least one first sensor data based on detecting at least one fluid characteristic of the at least one first fluid, wherein the at least one fluid characteristic comprises at least one of a pressure, a temperature, and a volume; and a processing device communicatively coupled with the at least one third sensor and the at least one sensor, wherein the processing device is configured for:

analyzing the at least one first sensor data and the at least one third sensor data based on at least one second criterion, wherein the at least one second criterion comprises at least one of a maximum operating pressure, a maximum operating volume, and a maximum operating temperature of the at least one second container;

determining a required amount of the mass flow rate of the at least one first fluid based on the analyzing; and generating a command for the transferring of the at least one first fluid to the at least one second container based on the determining, wherein the at least one actuator is communicatively coupled with the processing device, wherein the at least one actuator is configured for transitioning to one of a plurality of states for allowing the transferring of the at least one first fluid with the required amount of the mass flow rate based on the command, wherein the controlling comprises the allowing of the transferring of the at least one first fluid with the required amount of the mass flow rate.

4. The apparatus of claim 1 further comprising at least one fourth sensor configured for generating at least one fourth sensor data based on detecting at least one fluid characteristic of the third fluid, wherein the at least one fluid characteristic comprises at least one of a pressure, a temperature, and a volume, wherein the at least one regulator further comprises:
at least one sensor configured for generating at least one first sensor data based on detecting the at least one fluid characteristic of the at least one first fluid; and
a processing device communicatively coupled with the at least one fourth sensor and the at least one sensor, wherein the processing device is configured for:
analyzing the at least one first sensor data and the at least one fourth sensor data;
determining a required amount of the mass flow rate of the at least one first fluid based on the analyzing; and
generating a command for the transferring of the at least one first fluid to the at least one second container based on the determining,
wherein the at least one actuator is communicatively coupled with the processing device, wherein the at least one actuator is configured for transitioning to one of a plurality of states for allowing the transferring the at least one first fluid with the required amount of the mass flow rate based on the command, wherein the controlling comprises the allowing of the transferring of the at least one first fluid with the required amount of the mass flow rate.

5. The apparatus of claim 1, wherein the at least one regulator comprises at least one input device, wherein the at least one input device is configured for receiving the differential pressure range, wherein the maintaining of the differential pressure between the second pressure and the third pressure within the differential pressure range is based on the receiving of the differential pressure range.

6. The apparatus of claim 1, wherein the at least one first container has at least one first container volume, wherein the at least one second container has at least one second container volume, wherein the third container has a third container volume, wherein the at least one second volume is greater than the at least one first volume, wherein the third volume is greater than the at least one second volume.

7. The apparatus of claim 1, wherein the at least one first container comprises at least one high pressure cylinder, wherein the at least one second container comprises at least one dewar tank, wherein the third container comprises a bulk tank.

8. An apparatus for facilitating transferring fluids between containers, the apparatus comprising:
at least one first container configured for containing at least one first fluid, wherein the at least one first fluid comprises carbon dioxide gas, wherein the at least one first container is fluidly couplable with at least one second container using at least one fluid transferring mechanism, wherein the at least one fluid transferring mechanism comprises a pipe,
wherein a first pressure in the at least one first container due to the at least one first fluid contained the at least one first container is greater than a second pressure in the at least one second container due to at least one second fluid contained in the at least one second container, wherein the at least one second fluid comprises carbon dioxide gas, wherein the at least one first fluid is transferred from the at least one first container to the at least one second container containing the at least one second fluid through the pipe based on a difference between the first pressure and the second pressure;
the at least one second container is configured for filling a third container containing a third fluid at a third pressure, with the at least one first fluid and the at least one second fluid based on maintaining the second pressure greater than the third pressure, wherein the maintaining of the second pressure greater than the third pressure is based on transferring of the at least one first fluid into the at least one second container, wherein the third fluid comprises carbon dioxide gas
at least one regulator operatably coupled with the at least one first container, wherein the at least one regulator comprises at least one actuator, wherein the at least one actuator is coupled with the pipe, wherein the at least one regulator is configured for controlling a mass flow rate of the at least one first fluid transferred from the at least one first container to the at least one second container through the pipe, wherein the at least one actuator is configured for transitioning to one of a plurality of states for the controlling of the mass flow rate, wherein the controlling facilitates the maintaining of a differential pressure between the second pressure and the third pressure within a differential pressure range, wherein the at least one regulator further comprises:
at least one sensor configured for:
generating at least one first sensor data based on detecting at least one fluid characteristic of the at least one first fluid, wherein the at least one fluid characteristic comprises at least one of a pressure, a temperature, and a volume; and
generating at least one second sensor data based on detecting the at least one fluid characteristic of the at least one second fluid; and
a processing device communicatively coupled with the at least one sensor, wherein the processing device is configured for:
analyzing the at least one first sensor data and the at least one second sensor data;
determining a required amount of the mass flow rate of the at least one first fluid for the maintaining of the differential pressure between the second pressure and the third pressure based on the analyzing; and
generating a command for the transferring of the at least one first fluid to the at least one second container based on the determining, wherein the at least one actuator is communicatively coupled with the processing device, wherein the at least one actuator is configured for transitioning to one of a plurality of states for allowing the transferring of the at least one first fluid with the required amount of the mass flow rate based on the command, wherein the controlling comprises the allowing of the transferring of the at least one first fluid with the required amount of the mass flow rate; and at least one fifth sensor configured for generating at least one fifth sensor data based on detecting the at least one fluid characteristic of the third fluid, wherein the processing device is communicatively coupled with the at least one fifth sensor, wherein the processing device is further configured for:
analyzing the at least one fifth sensor data; and
determining the differential pressure range for the differential pressure based on the analyzing, wherein the maintaining of the differential pressure between the second pressure and the third pressure within the differential pressure range based on the determining.

9. The apparatus of claim 8 further comprising at least one third sensor configured for generating at least one third sensor data based on detecting at least one characteristic of the at least one second container, wherein the at least one characteristic comprises at least one of an operating pressure, an operating volume, and an operating temperature of the at least one second container, wherein the processing device is communicatively coupled with the at least one third sensor, wherein the processing device is further configured for analyzing the at least one third sensor data based on at least one second criterion, wherein the at least one second criterion comprises at least one of a maximum operating pressure, a maximum operating volume, and a maximum operating temperature of the at least one second container, wherein the determining of the required amount of the mass flow rate of the at least one first fluid is further based on the analyzing of the at least one first sensor data and the analyzing of the at least one third sensor data.

10. The apparatus of claim 8 further comprising at least one fourth sensor configured for generating at least one fourth sensor data based on detecting the at least one fluid characteristic of the third fluid, wherein the processing device is communicatively coupled with the at least one fourth sensor, wherein the processing device is further configured for analyzing the at least one fourth sensor data, wherein the determining of the required amount of the mass flow rate of the at least one first fluid based on the analyzing of the at least one fourth sensor data and the analyzing of the at least one first sensor data.

11. The apparatus of claim 8, wherein the at least one regulator comprises at least one input device, wherein the at least one input device is configured for receiving the differential pressure range, wherein the maintaining of the differential pressure between the second pressure and the third pressure within the differential pressure range is based on the receiving of the differential pressure range.

12. The apparatus of claim 8, wherein the at least one first container has at least one first container volume, wherein the at least one second container has at least one second container volume, wherein the third container has a third container volume, wherein the at least one second volume is greater than the at least one first volume, wherein the third volume is greater than the at least one second volume.

13. The apparatus of claim 8, wherein the at least one first container comprises at least one high pressure cylinder, wherein the at least one second container comprises at least one dewar tank, wherein the third container comprises a bulk tank.

14. An apparatus for facilitating transferring fluids between containers, the apparatus comprising:
at least one first container comprising at least one high pressure tank, wherein the at least one first container is configured for containing at least one first fluid, wherein the at least one first fluid comprises carbon dioxide gas, wherein the at least one first fluid is carbon dioxide fluid, wherein the at least one first container is fluidly couplable with at least one second container using at least one fluid transferring mechanism, wherein the at least one fluid transferring mechanism comprises a pipe,
wherein a first pressure in the at least one first container due to the at least one first fluid contained the at least one first container is greater than a second pressure in the at least one second container due to at least one second fluid contained in the at least one second container, wherein the at least one second fluid comprises carbon dioxide gas, wherein the at least one first fluid is transferred from the at least one first container to the at least one second container containing the at least one second fluid through the pipe based on a difference between the first pressure and the second pressure;
the at least one second container is configured for filling a third container containing a third fluid at a third pressure, with the at least one first fluid and the at least one second fluid based on maintaining the second pressure greater than the third pressure, wherein the maintaining of the second pressure greater than the third pressure is based on transferring of the at least one first fluid into the at least one second container, wherein the third fluid comprises carbon dioxide gas, wherein the at least one second container comprises at least one dewar tank, wherein the third container comprises a bulk tank;
at least one regulator operatably coupled with the at least one first container, wherein the at least one regulator comprises at least one actuator, wherein the at least one actuator is coupled with the pipe, wherein the at least one regulator is configured for controlling a mass flow rate of the at least one first fluid transferred from the at least one first container to the at least one second container through the pipe, wherein the at least one actuator is configured for transitioning to one of a plurality of states for the controlling of the mass flow rate, wherein the controlling facilitates the maintaining of a differential pressure between the second pressure and the third pressure within a differential pressure range, wherein the at least one regulator further comprises:
at least one sensor configured for:
generating at least one first sensor data based on detecting at least one fluid characteristic of the at least one first fluid, wherein the at least one fluid characteristic comprises at least one of a pressure, a temperature, and a volume; and
generating at least one second sensor data based on detecting the at least one fluid characteristic of the at least one second fluid; and
a processing device communicatively coupled with the at least one sensor, wherein the processing device is configured for:
analyzing the at least one first sensor data and the at least one second sensor data;
determining a required amount of the mass flow rate of the at least one first fluid for the maintaining of the differential pressure between the second pressure and the third pressure based on the analyzing; and
generating a command for the transferring of the at least one first fluid to the at least one second container based on the determining,
wherein the at least one actuator is communicatively coupled with the processing device, wherein the at least one actuator is configured for transitioning to one of a plurality of states for allowing the transferring of the at least one first fluid with the required amount of the mass flow rate based on the command, wherein the controlling comprises the allowing of the transferring of the at least one first fluid with the required amount of the mass flow rate; and at least one fifth sensor configured for generating at least one fifth sensor data based on detecting the at least one fluid characteristic of the third fluid, wherein the processing device is communicatively coupled with the at least one fifth sensor, wherein the processing device is further configured for:

analyzing the at least one fifth sensor data; and determining the differential pressure range for the differential pressure based on the analyzing, wherein the maintaining of the differential pressure between the second pressure and the third pressure within the differential pressure range based on the determining.

* * * * *